(No Model.)
H. J. VOGLER & A. FLORES.
TROLLEY GUARD.
No. 596,926. Patented Jan. 4, 1898.
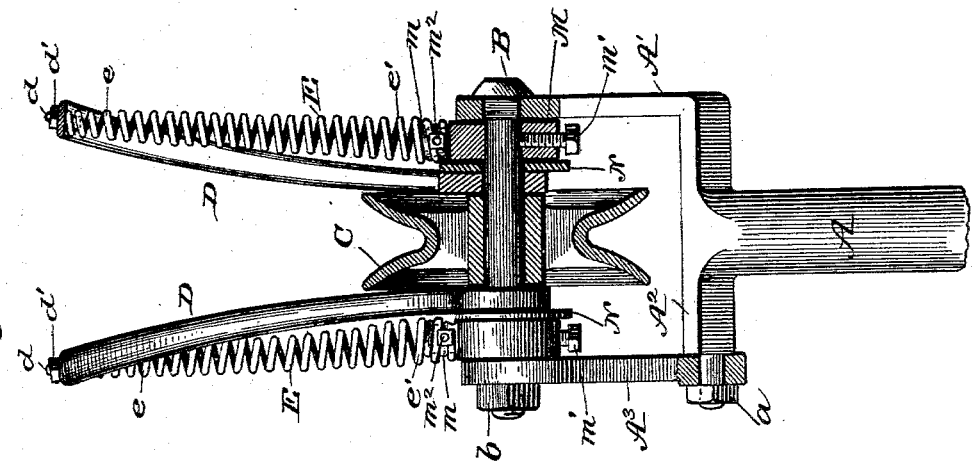
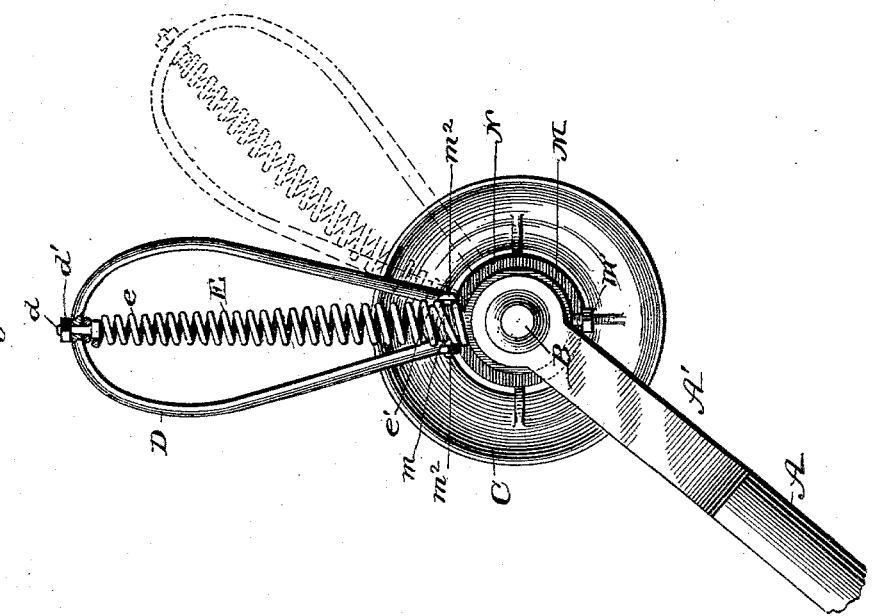
WITNESSES:
Jos. A. Ryan
Edw. W. Byrn.
INVENTORS
Herman J. Vogler.
Alfredo Flores.
BY Munn & Co
ATTORNEYS.

UNITED STATES PATENT OFFICE.

HERMAN J. VOGLER AND ALFREDO FLORES, OF SAN ANTONIO, TEXAS; SAID FLORES ASSIGNOR TO SAID VOGLER.

TROLLEY-GUARD.

SPECIFICATION forming part of Letters Patent No. 596,926, dated January 4, 1898.

Application filed October 16, 1897. Serial No. 655,477. (No model.)

*To all whom it may concern:*

Be it known that we, HERMAN J. VOGLER and ALFREDO FLORES, of San Antonio, in the county of Bexar and State of Texas, have invented a new and useful Improvement in Trolley-Guards, of which the following is a specification.

Our invention is designed to provide a means for preventing the trolley-wheel at the top of a trolley-pole from jumping from the conducting-wire, thus avoiding the stopping of the car, the breakage of the cross supporting-wires or the feeder-wire, and the danger, expense, and delay incident thereto.

Our invention consists in the peculiar construction and arrangement of a pair of yielding guards with their springs arranged one on each side of the trolley-wheel, which guards hold the wheel on the wire, but yield and pass under the cross supporting-wires without doing damage to the same, as will be hereinafter more fully described.

Figure 1 is a side view, partly in section, of a trolley provided with our guards; and Fig. 2 is a front view, partly in section.

A is the trolley-pole, which has a bracket-shaped upper end A', which is perforated with a square hole to form a bearing for the axial bolt B, which latter is made to fit the square hole so that it will not turn therein. The right-angular part A² of the bracket-shaped frame is reduced in size and screw-threaded and extended through a hole in a detachable plate A³, which is parallel to the side A' of the wheel-frame and is retained in place by a nut $a$ and also by the nut $b$ of the axial bolt.

C is the trolley-wheel, which turns freely on the axial bolt B. On each side of this trolley-wheel is arranged one of our guards D, which are made in the form of open loops or bowed wings, curved so as to readily pass over obstructions. The hub portion of these guards is made in the form of perforated disks fitting over the axial bolt.

The trolley-guards D are made yielding either backward or forward by means of helical springs E, arranged radially to the axis. These springs may be tapered, as shown, or straight. Their outer ends $e$ lie within the bowed branches of the guards and are connected firmly to the head of a bolt $d$, which passes through a hole in the middle of the bowed part of the guard and is secured by a nut $d'$ on the outside. The inner ends of these springs $e'$ are wrapped around and secured to a stud $m$ on a collar M, which embraces the axle and is rigidly attached to it by a set-screw $m'$. The stud $m$ is formed with an external screw-thread fitting the coils of the spring which it enters, and a short bolt $m^2$ passes through it to securely hold the coils of said spring on said stud. The collar, it will be seen, is rigid on the axle, and between said collar and the perforated inner ends of the guards are arranged washers N N. Now when the guards are held to their positions by these springs it will be seen that the line-wire cannot get from between them, nor can the wire get jammed or caught between the guards and the trolley-wheel, and yet these guards readily yield to any obstruction and return again from the action of these springs both in forward and backward direction.

We are aware that it is not new to provide trolley-poles with yielding guards for its wheel, and we make no broad claim to this feature, but only to the special construction of the guard and its combination with the trolley-wheel, the springs, and the axial bolt and the special construction of the frame holding the same.

Our invention will work either way in going forward or backward and may be used with the same trolley-pole ordinarily used.

Having thus described our invention, what we claim as new, and desire to secure by Letters Patent, is—

1. The combination with the trolley-wheel and its axial bolt; of bowed or loop-shaped guards hung loosely on the axial bolt on each side of the trolley-wheel, and a spring on each side connected at one end rigidly to the axial bolt and extending radially into the bow of the guard and secured within said bow to the middle of the outer portion of the same substantially as and for the purpose described.

2. The combination with the trolley-wheel, and its axial bolt; of bowed or loop-shaped guards hung loosely upon the axial bolt on each side of the trolley-wheel, spiral or helical springs arranged radially on the axial bolt, a screw-threaded bolt passing through the outer portion of each guard and securing the outer end of each spring, and a collar with projecting stud for each spring said collar being rigidly attached to the axial bolt, and its stud being entered into and connected with each of said springs substantially as and for the purpose described.

3. The combination with the trolley-wheel, and its axial bolt; of the bowed or loop-shaped guards hung loosely upon the axial bolt on each side of the trolley-wheel, a spiral or helical spring arranged radially within each bow and connected at its outer end to the middle of the bow, a collar on each side having a screw-threaded stud entered into the spring and secured thereto, said collar being rigidly attached to the axial bolt, and a washer on each side arranged between said rigid collars and the perforated ends of the guards, substantially as and for the purpose described.

4. The trolley-pole A having at its ends a bracket-shaped piece, one side $A'$ of which is perforated and forms one side of the wheel-frame, and the other $A^2$ of which projects at right angles, is made in one piece with parts A and $A'$ and is reduced and screw-threaded and provided with a nut, a detachable side piece $A^3$ forming the other side of the wheel-frame, the axial bolt passing between and through the top side pieces of the frame, and the trolley-wheel guards and springs arranged upon the axial bolt, substantially as and for the purpose described.

HERMAN J. VOGLER.
ALFREDO FLORES.

Witnesses to the signature of Herman J. Vogler:
JNO. SCHOREN,
A. L. WYNNE.

Witnesses to the signature of Alfredo Flores:
EVERARD BOLTON MARSHALL,
A. LURCOTT.